United States Patent [19]

Billeter

[11] 3,900,086
[45] Aug. 19, 1975

[54] AUTOMATIC DOUBLE-ACTING SLACK ADJUSTER
[75] Inventor: Henry R. Billeter, Marco Island, Fla.
[73] Assignee: Sloan Valve Company, Franklin Park, Ill.
[22] Filed: Nov. 4, 1974
[21] Appl. No.: 520,408

[52] U.S. Cl............................ 188/202; 188/196 D
[51] Int. Cl............................................. F16d 65/66
[58] Field of Search......... 188/196 D, 916 BA, 202, 188/203

[56] References Cited
UNITED STATES PATENTS
3,669,224   6/1972   Billeter ............................. 188/202

Primary Examiner—Duane A. Reger
Attorney, Agent, or Firm—Kinzer, Plyer, Dorn & McEachran

[57] ABSTRACT

A slack adjuster of the double acting type for railway cars has three spin nuts arranged on a threaded rod. The spin nuts are variably operated to take up or let out slack in the brake rigging and have clutch surfaces cooperating with the spin nuts to engage and stop their rotation. The spin nuts are normally clutched to prevent unintended relative movements under operating conditions of vibration and shock. In addition a separate slip cone clutch is provided in association with one of the spin nuts to prevent the slack adjuster from taking up the slack of that portion of the piston travel resulting from elastic deflection in the brake rigging.

10 Claims, 6 Drawing Figures

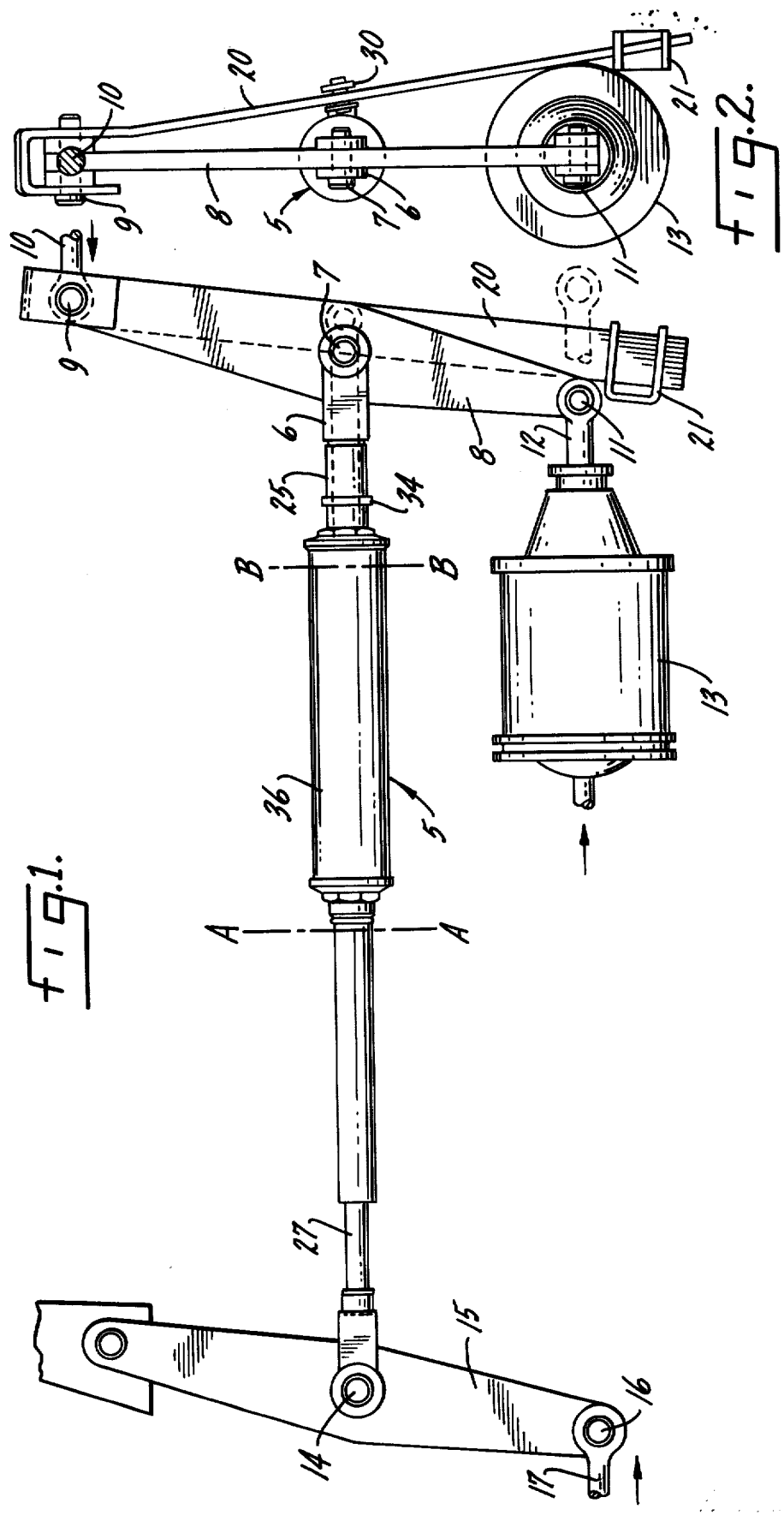

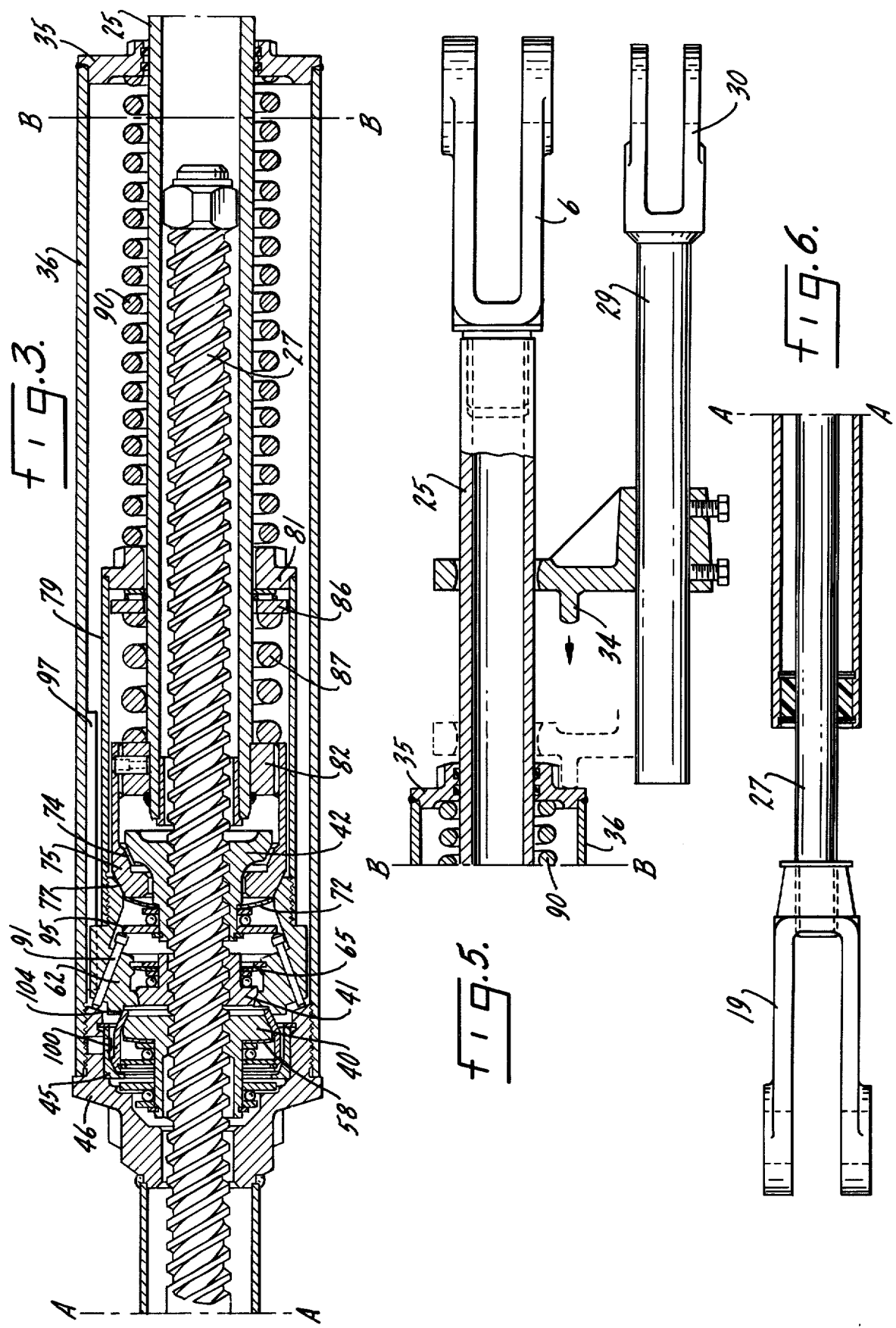

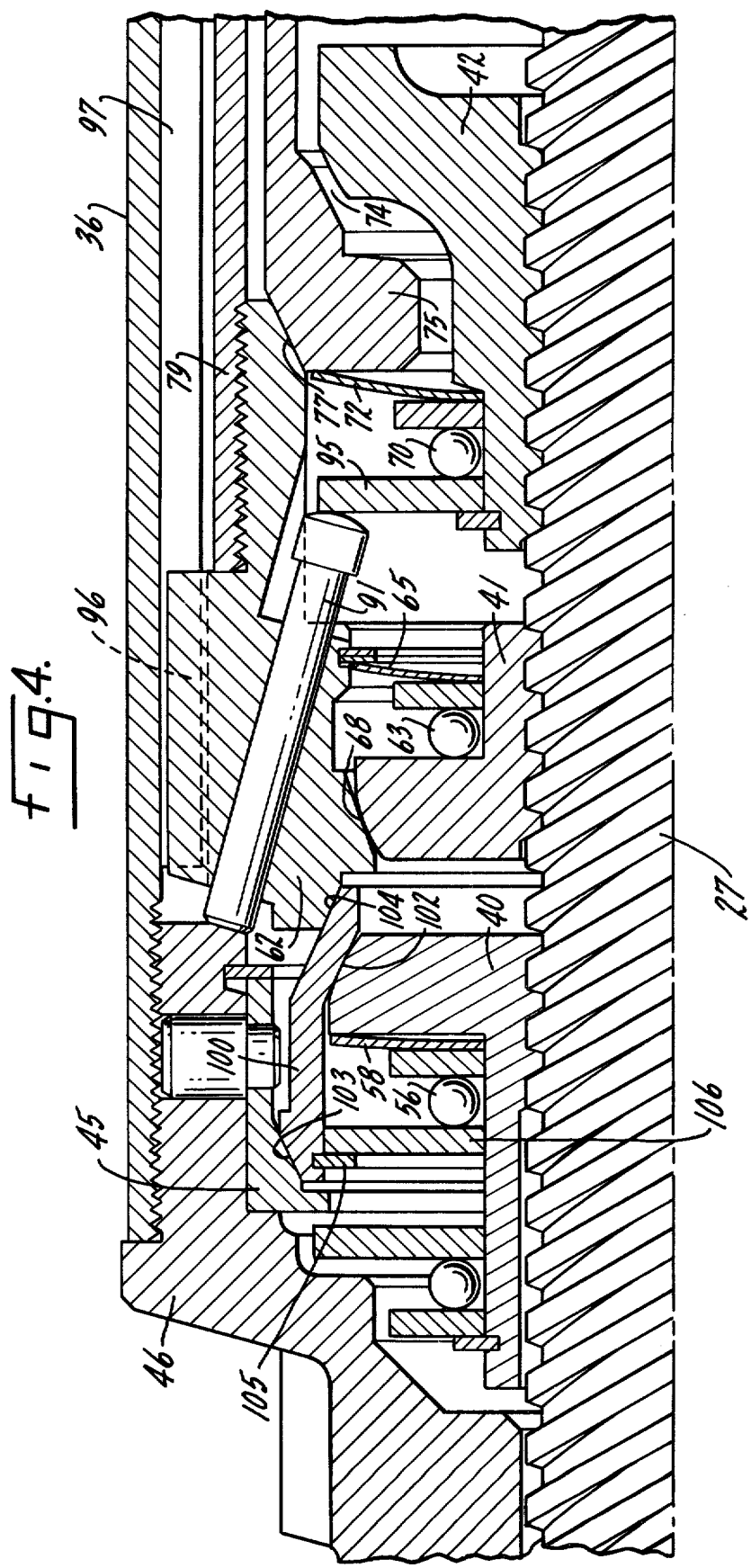

AUTOMATIC DOUBLE-ACTING SLACK ADJUSTER

This invention is in the nature of an improvement upon U.S. Pat. No. 3,669,224 issued June 13, 1972 to Henry R. Billeter and assigned to the same interests, and to which reference is made.

BACKGROUND OF THE INVENTION

In the aforesaid patent the double acting slack adjuster is automatically operative to either reduce or increase the amount of slack in the braking system so as to provide the required travel of the piston in the brake cylinder at all times. This arrangement has worked satisfactorily when the slack adjuster was installed upon standard freight cars in common use at the present time. However, many new freight cars are now being constructed which are much longer in length and often carry heavier loads. These include tank cars, trailer cars, gondolas, etc. The brake rigging on these relatively long freight cars necessarily consists of long rods, levers and other complicated linkage which has a tendency to sagging, looseness and abnormal stretching of the linkage. This stretching or elasticity, better known as deflection, has an adverse effect upon the slack adjuster because it is difficult for it to differentiate between slack caused by wear and looseness in the rigging and that stretching or elasticity caused by the excessively long brake linkage and its resultant deflection. In addition some braking difficulty has been experienced in the past with trailer train cars due to weak brake beams rather than long rods, which contributed to deflection of the rigging. Some brake beams would tend to bend under heavy brake pressures and thus add to the deflection slack. As a result of the inability of the former slack adjusters to differentiate between the normal slack conditions and the deflection caused by stretching of the brake rigging, the slack adjuster would operate to permanently lock up at times during a brake application, rendering it inoperative for further slack adjustments.

According to the present invention, in the braking system the travel of the brake cylinder piston responsive to any brake application, consists of two separate parts, first the actual movement necessary due to wear of the brake shoes, and second movement due to the elasticity or deflection of the brake rigging (elastic stroke). Any brake application lock up of the slack adjuster occurs at the beginning of the elastic portion of the piston stroke, and on any given freight car the elastic stroke is proportional to the load imposed on the slack adjuster.

Slack adjusters are usually installed so that the desired piston travel is obtained with 50 P.S.I. brake cylinder pressure. In extreme conditions a combination of a high train line pressure, emergency brake application, and hand brake setting on top of the air pressure, will result in the elastic or deflection slack to be increased up to a value of four times the normal amount.

In the slack adjuster of U.S. Pat. No. 3,669,224 previously mentioned, upon release of the brakes, all of the slack is taken up plus that of the elastic stroke, which slack must all be let out upon the next brake application. In the present invention the slack resulting from the elastic or deflection stroke is not taken up by the slack adjuster.

It is an object of the invention to provide an automatic slack adjuster arranged so that when there is elasticity in the braking system, the slack adjuster will distinguish normal brake shoe wear slack from elastic deflection slack and not permanently lock up under such conditions.

Another object is to provide a regular automatic double acting slack adjuster in which a simple additional element is added so the slack adjuster can operate satisfactorily when installed upon relatively long freight cars in which the brake rigging is elastic and subject to deflection, and will operate as well as on standard length freight cars. This feature provides improved performance, and durability is greatly increased when installed on any type of cars.

BRIEF SUMMARY OF THE INVENTION

The invention consists in providing an annular slip clutch in a slack adjuster arranged between the take-up spin nut and the trigger housing which clutch will slip during release of the brakes until the tension on the slack adjuster is almost relieved, and then provide enough tension to take up any excess slack that may exist.

BRIEF DESCRIPTION OF THE DRAWINGS

FIG. 1 is a plan view illustrating part of a typical brake rigging arrangement on a railway car together with a slack adjuster embodying the invention;

FIG. 2 is an end view of the right hand end of FIG. 1 showing the trigger mechanism;

FIG. 3 is a cross-sectional view of the center portion of the slack adjuster taken between the points A and B of FIG. 1;

FIG. 4 is an enlarged partial section of the slack adjuster showing the spin nuts and slip clutches;

FIG. 5 is a view of the right hand end of the slack adjuster taken from point B; and FIG. 6 is a view of the left hand end of the slack adjuster taken from point A.

The improved automatic double acting slack adjuster is adapted for installation in the brake rigging of a railway car and is connected in the usual position between the brake cylinder and brake shoes and specifically as a center rod connection between the live lever and dead lever. The slack adjuster is equally applicable to top rod installation as is understood. When so installed the slack adjuster will automatically take up excess slack due to normal brake shoe wear and brake rigging wear, and let out slack as when new brake shoes are installed. This action will automatically maintain the stroke of the brake cylinder within the limits presented by railroad practice regulations. When this slack adjuster according to the invention is installed on long freight cars with the inherent elasticity and stretch in the brake rigging, the slack adjuster will continue to operate satisfactorily to take up only the normal amount of slack and to ignore the deflection as if it did not exist. It will not lock up permanently on the excessive abnormal amount of elastic deflections.

DETAILED DESCRIPTION OF THE INVENTION

Since the general details and structure of the present slack adjuster are pointed out specifically in the aforesaid U.S. Pat. No. 3,669,224, only those details and specific operation relating to the present invention and the improvement, will be described.

Referring to FIG. 1 of the drawings, the slack adjuster indicated generally at 5 is pivotally connected, by pin 7, at the right hand end by the clevis 6 to the center portion of the live lever 8. The upper end of live lever 8 is connected to a portion of the brake rigging and linkage 10 leading to the brake shoes of the freight car. This linkage indicated only partially at 10 may include an extensive amount of long rods, levers and other linkage (not shown) which is necessary on the long freight cars, tank cars and gondolas commonly employed at the present time for use on train systems. The bottom end of live lever 8 is connected by pin 11 to push rod 12 of brake cylinder 13. The left hand of slack adjuster 5 is connected by clevis 14 to dead lever 15 which at its bottom end 16 is connected to another portion of the elastic brake rigging 17 leading to another truck of the railway car and the brake shoes thereon. Adjacent to live lever 8 is the actuating or trigger lever 20 pivoted at its upper end at pin 9 and its lower end slidable in bracket 21.

The general arrangement of the foregoing braking elements, except for the excessive long rigging, is well known and is such that outward projection of push rod 12 by operation of the brake cylinder 13 during a braking operation, results in the pivoted movement of levers 8 and 15 together with the axial movement of slack adjuster 5, so the braking forces are applied to the brake linkages 10 and 17 in the direction of the arrows, thereby producing an application of the brake shoes to the freight car wheels.

The slack adjuster 5 includes a tubular pull rod 25 arranged for longitudinal movement and connected at one end with clevis 6. A threaded rod 27 is telescopically disposed within pull rod 25 for shifting movement relative to the tube 25 and a substantial portion of the length of the rod 27 is provided with non-self-locking threads having a high helix angle and upon which a series of three spin nuts are adapted to be rotated, as will be pointed out hereinafter. A trigger or sensing arrangement includes a trigger rod 29 secured at one end 30 to the actuating lever 20. It has a bracket 34 which loosely surrounds pull rod 25 which under certain conditions of operation is adapted to engage the end cap 35 of the trigger tube housing 36. The movement of the trigger lever 20 is so designed as to be proportional to the travel of the piston in the brake cylinder.

The threaded rod 27 carries in threaded engagement therewith a series of three spin nuts consisting of a take-up spin nut 40, a let-out spin nut 41 and a lock-up spin nut 42, all arranged in order on the rod 27 and freely rotatable under certain conditions of operation to either take up or let out slack in the braking system. The take-up spin nut 40 is normally held in clutching engagement by Bellville spring washer 58 at 102, with the slip cone clutch member 100. The let-out spin nut 41 is held in clutching engagement by bowed spring washer 65 at 68, with traction sleeve 62 which is threaded onto traction tube 79, while lock-up spin nut 42 is normally spaced at 74 from clutching engagement with the clutching sleeve 75. Suitable bearings 56, 63 and 70 and supporting washers are interposed between the spin nuts and their associated bowed washers as shown. The slip cone clutch 100 is also normally held in clutching engagement at 103 with the housing part 45 attached to housing 46. In addition the slip cone clutch 100 is in clutching engagement at 104 with the traction sleeve 62. Surrounding the pull rod 25 is the let-out spring 87 extending between the washer 86 and bushing 82 of the clutching sleeve 75. This let-out spring has a compression force of 1,800 pounds. A trigger spring 90 also surrounds the pull rod tube and extends between the end caps 81 and 35. It has a compression force of 350 pounds.

Referring now to the traction sleeve 62, this supports a series of push pins 91 slidable therein which pins at one end are in contact with washer 95 of spin nut 42, and at the other end with housing 46. The outer edge of traction tube 62 has a slotted keyway 96 slidable on elongated key 97 welded to the inner side of trigger tube 36. The key 97 permits relative axial or longitudinal movement between trigger tube 36 and the sleeve 62 while insuring that these parts will rotate together under certain conditions of operation. Other specific details of construction and operation not pertinent to the present invention are as described in the aforesaid U.S. Pat. No. 3,669,224.

DESCRIPTION OF THE OPERATION

In the running condition of the railway car, the slack adjuster parts are normally positioned as shown in FIGS. 1, 3, and 4. When a brake application under normal slack condition takes place, the pull rod tube 25 will tend to move to the right out of the trigger tube 36, and at the same time the threaded rod 27 will tend to move to the left, so as to create tension in the slack adjuster. The let-out spring 87, which has an applied force of about 1,800 pounds will hold the parts in the position shown until such time as about 10 pounds of air pressure is applied to the brake cylinder 13 and this force in turn to the braking system. The path of this force extends from the pull rod tube 25 to the clutching sleeve 75 and bushing 82, let-out spring 87, traction tube 79 and traction sleeve 62, clutch surface 68, to let-out spin nut 41 and threaded rod 27. After the force of the let-out spring 87 has been overcome, the frictional contact between clutch surfaces 77 is reduced to the effect that the traction sleeve 62, trigger tube 36, through keyway 96 and 97, and the let-out spin nut 41; together with take-up spin nut 40, will also revolve around the threaded rod 27 to let out slack. The slip cone clutch 100 at clutch surfaces 102 and 104 transmits this revolving force to spin nut 40.

The let out action continues until the trigger lug 34 moves to the left and engages the casing cap 35 to shift the casing 36 and housing 46 to the left. The housing 46 moves away from the push pins 91 thereby permitting the spring washer 72 to exert its force and seat lock-up spin nut 42 upon clutch surface 74 and against sleeve 75, thereby locking up the slack adjuster. At this time the housing 46 and trigger tube 36 move to the left so that the push pins 91 are free of thrust washer 95 and so that the bowed spring washer 72 on spin nut 42 additionally urges clutch surfaces 75 more tightly into lock up engagement. The slack adjuster is now fully locked up and the brakes firmly applied to the car wheels through the brake linkage and the slack adjuster. The lock-up path extends through threaded rod 27, spin nut 42, sleeve 75 and pull rod 25. The slip cone clutch 100 at this time is ineffective although the clutching surfaces 103 are disengaged, while the clutching surfaces 102 and 104 are in engagement therewith and with spin nut 40.

Upon release of the brakes which occurs when the piston of the brake cylinder 13 restores, the trigger or actuator lever 20 causes the bracket 33 and its projecting lug 34 to move away and to the right from the end cap 35 and trigger tube 36. Tension is thereby removed from the slack adjuster, permitting the let-out spring 90 to expand and shift the trigger tube 36 to the right hand side. The spin nut 40 as a result is caused to be shifted to the right and this in turn moves the threaded rod 27 to the right or into telescoping relation with the pull rod tube 25. This action also shifts spin nut 41 away from clutch surface 68 and spin nut 42 from clutch surface 74. Both of the spin nuts 41 and 42 now rotate to complete the take up, after which the slack adjuster is locked up as has been pointed out.

Assume now that a brake application is made when there is an excess of slack in the braking system, which may occur on account of brake shoe wear or loss of a shoe. It is therefore necessary to take up this excess slack automatically by operation of the slack adjuster. The take-up action occurs as the braking action takes place and after the brake cylinder push rod 12 is extended beyond the limits of its permitted stroke. The trigger lever 20 then moves its bracket 33 so that projecting lug 34 engages the end cap 35 thereby causing trigger tube 36 to shift or move the tube 36 to the left. Clutching surface 103 is accordingly separated permitting spin nut 40 to rotate and follow the clutch 44, the bowed spring washer 58 holding and urging the spin nut 40 close to the clutch surface 103. The threaded rod 27 is prevented from moving to the left by spin nut 41 engaging clutch 68 with clutch sleeve 62. This action all occurs during the initial portion of the braking movement and as soon as left hand ends of the push pins 91-93 are moved away from the housing 46. Spin nut 42 is thus permitted to engage clutch surface 74 so that the threaded rod 27 is now locked up to transmit the braking forces directly to the brakes.

The actual take up occurs upon the release of the brakes when the brake cylinder push rod retracts. The projecting lug 34 then moves away from the trigger tube 36 relieving tension from the slack adjuster and allowing trigger spring 90 to expand and shift trigger tube 36 to the right. Spin nut 40 is shifted to the right by engagement of clutch surface 103 which moves the threaded rod 27 to the right. This unseats clutch surfaces 68 and 74 of spin nuts 41 and 42, which thereby rotate to complete the take up of slack.

The foregoing describes the normal operation when the brake rigging, levers, rods, and other linkage are of normal stretch or the linkage not too elastic and deflective. However, where long railway cars are employed, this brake rigging and linkage is subject to excessive deflection or stretching, it is necessary for the slack adjuster to differentiate between the normal slack in a standard freight car and the rigging deflection in a long freight car, and to ignore the deflection so that the brakes can be effectively applied. After slack has been let out as described above, in connection with the normal brake applying action of the slack adjuster, if piston travel continues, because of rigging deflection, it is desired that there be no subsequent slack take-up due to compensate for such rigging deflection. Accordingly, continued movement to the left by tube 25 will cause trigger lug 34 to move housing 36 to the right. This movement will tend to compress trigger spring 90, relieving the frictional pressure between clutch surfaces 103. Since spring 58 still effectively closes clutch surfaces 102, spin nut 40 and slip cone clutch 100 will together rotate on rod 27 and follow the relative left hand movement of housing 36. Thus, spin nuts 40 and 41 will be separated.

In a normal slack take-up operation, this distance would be closed by the left hand movement of spin nut 41 and 42. However, when the brakes are released, initially the force of trigger spring 90 is substantially greater than the 300-pound force of spring 58, with the result that rather than having rod 27 move to the right, as it would in the normal slack take-up operation, spin nut 40 will rotate within slip cone clutch 100 on rod 27 as housing 36 moves to the right. There will be no movement of the rod. At such time as there is less force provided by trigger spring 90 than the 300-pound force of spring 58, then the normal slack take-up operation will begin and spin nuts 41 and 42 will move on rod 27 as described above. Thus, there will be no slack taken up due to rigging deflection because spring 58 will be overcome by the force of trigger spring 90 and spin nut 40 will slip at clutch surfaces 102 within the slip cone clutch 100.

Thus, during the slack let-out operation, slip cone clutch 100 and spin nut 40 rotate at clutch surfaces 103. Housing 36 does not rotate. During slack take-up, spin nut 40 rotates relative to slip cone clutch 100 at surfaces 102 and there is no slack taken up until the 300-force of spring 58 is no longer overcome by the force of trigger spring 90.

Assume now a condition in which the brakes are too tight as where new brake shoes are installed, so that it is necessary to let out a certain amount of slack to prevent locking or skidding wheels when the brakes are applied. Where such insufficient slack exists, tension is present in the system which applies stress to the slack adjuster, and before trigger lever 20 moves projecting lug 34 into contact with the end cap 35 of trigger tube 36. This mounting tension tends to move the threaded rod 27 to the left but the rod is restrained by the spin nuts 40 and 41 because their clutch surfaces 102, 103, 104 and 77 are in engagement with the spin nuts which are also being pulled to the left. When sufficient tension has been applied and reached a value of 1,800 pounds, the let-out spring 87 is compressed so that frictional contact between clutch surfaces 77 is reduced as well as clutch surfaces 104 and 102, thereby permitting the spin nuts 40 and 41 to rotate to the right along threaded rod 27. The traction sleeve 79 and trigger tube 36 also rotates because of the keyway 96 and 97. The foregoing elements will continue to rotate around the threaded rod 27 and pay out the slack until trigger lever 20 extends the projecting lug 34 into contact with trigger tube 36 and shifts the tube to the left. This action frees the push pins 91 and permits the spin nut 42 to close clutch surfaces 74 and prevent further let out and to lock up the slack adjuster. The brakes are now firmly applied. The release action takes place in the manner previously pointed out.

In the aforesaid U.S. Pat. No. 3,669,224 the slippage at clutch surfaces 77 between sleeve 75 and casing 79 is equal to the elastic stroke of the piston upon the next application of the brakes under an 1,800 pound load. In the present invention however, the slippage at clutch surfaces 77 is equal to the elastic stroke which occurs upon release of the brakes at a 300-pound force.

What is claimed is:

1. In an automatic slack adjuster for railway car brakes, a pull rod tube connected to one portion of the braking system, a threaded rod arranged telescopically within said pull rod tube and connected to another portion of the braking system, a plurality of spin nuts arranged on said threaded rod for rotation thereon, said spin nuts comprising a take-up spin nut, a let-out spin nut, and a lock-up spin nut, said let-out spin nut being located on said threaded rod between said other spin nuts, a clutching sleeve on one end of said pull rod, cooperating clutching surfaces between said clutching sleeve and said lock-up spin nut, a traction tube around said pull rod tube and said spin nuts, cooperating clutching surfaces between said traction tube and said clutching sleeve, cooperative clutching surfaces between said traction tube and said let-out spin nut, a trigger tube surrounding said pull rod tube, a housing around said threaded rod secured to said trigger tube, a trigger spring between said trigger tube and said traction tube, a let-out spring between said traction tube and said clutching sleeve, both of said springs being around said pull rod tube, a plurality of push pins slidably extending through said traction tube and having one end in engagement with said housing and the other end with said lock-up spin nut, and a slip cone clutch member arranged around said take-up spin nut, having cooperating clutch surfaces with each of said take-up spin nuts, said housing, and said traction tube, said slip cone clutch member operative in response to excessive deflection and stretching of the brake rigging to cause it to slip between said clutch surfaces and take up the slack in said slack adjuster and then to lock up the slack adjuster.

2. In a double acting slack adjuster for railway car braking systems in which the brake rigging comprises elements subject to stretching and deflection during braking actions, a pull rod tube connected to one portion of the braking system, a threaded rod axially extending through said pull rod tube and connected to another portion of the braking system, a plurality of spin nuts on said threaded rod including a take-up spin nut, a let-out spin nut, and a lock-up spin nut, a clutching sleeve attached to said pull rod tube having clutching engagement with said lock-up spin nut, a traction tube having clutching engagement with each of said clutching sleeves and said let-out spin nut, a trigger tube surrounding said slack adjuster and enclosing all elements, a housing at one end of said trigger tube, push pins slidably arranged through said traction tube and extending between said housing and said lock-up spin nut, a trigger spring between said trigger tube and said traction tube, a let-out spring between said traction tube and said clutching sleeve, a separate bowed spring washer in engagement with each of said spin nuts for normally urging said spin nuts into their associated clutching engagements, a slip cone clutch member arranged around said take-up spin nut having cooperating clutching surfaces in normal engagement with each of said take-up spin nuts, said housing and said traction tube, and means responsive to a condition of a normal amount of slack in the braking system for causing said trigger tube to move inward and said spin nuts to rotate inward until all slack is taken up and the slack adjuster is locked up, and means responsive to a condition of insufficient slack in the braking system to rotate said spin nuts on said threaded rod outward together with said trigger tube and said traction tube until sufficient slack has been let out and said slack adjuster is locked up, and means responsive to an excessive amount of stretching and deflection in said brake rigging during a braking operation for causing said slip cone clutch to slip between its clutching surface with said take-up spin nut and take up of the slack and then to lock up the slack adjuster.

3. The slack adjuster as claimed in claim 2 in which the slip cone clutch surrounds the take-up spin nut and has clutching engagement therewith in the normal position of the slack adjuster, said clutching engagement being effected by a bowed spring washer extending between said take-up spin nut and said slip cone clutch.

4. The slack adjuster as claimed in claim 2 characterized by said slip cone clutch having clutching engagement at one end with the periphery of said take-up spin nut, and a bearing and bowed spring washer extending from the other end to said take-up spin nut, whereby said take-up spin nut is normally held in clutching engagement with said slip cone clutch.

5. The slack adjuster as claimed in claim 2 in which said slip cone clutch is located around said take-up spin nut and has cooperative clutching engagement therewith at its inner surface, and clutching engagement at its outer surface at one end with the housing, and another clutching engagement at its outer surface at the other end with said traction tube.

6. The slack adjuster as claimed in claim 2 in which the slip cone clutch is normally held in clutching engagement with said take-up spin nut by a bowed spring washer, said bowed spring washer having a spring load of a value that upon normal take-up of slack said slip cone clutch remains locked in clutching engagement with said take-up spin nut, said bowed spring washer also having a spring load of a value to cause said slip cone clutch to slip responsive to a force indicating that the brake rigging is stretched and deflected.

7. The slack adjuster as claimed in claim 2 in which the bowed spring washer has a spring load of a value of approximately 300 pounds effective to cause said slip cone clutch to slip on said take-up spin nut under conditions of excessive slack in the brake rigging.

8. In an automatic slack adjuster for railway car brakes, a tube connected to one portion of the brake rigging, a threaded rod telescopically positioned within said tube and connected to another portion of the brake rigging, a movable housing positioned about a portion of said tube and rod, a sleeve positioned within said housing, three spin nuts threadedly mounted on said rod and having clutch surfaces thereon for use in interconnecting said rod, housing, sleeve and tube, a slip cone clutch positioned between one of said spin nuts and said housing, a trigger spring effective between said housing and sleeve, said rod being freely rotatable in said spin nuts for use in installing said slack adjuster, one of said spin nuts normally being biased into engagement with said slip cone clutch, said slip cone clutch being normally biased into engagement with said housing, another of said spin nuts normally being biased into engagement with said sleeve, and said third spin nut normally being biased away from said sleeve.

9. The structure of claim 8 further characterized in that said slip cone clutch has clutch surfaces positioned for engagement with said housing and said sleeve.

10. The structure of claim 9 further characterized in that said slip cone clutch has a portion positioned between said one spin nut said sleeve.

* * * * *